United States Patent [19]

David

[11] 4,364,708
[45] Dec. 21, 1982

[54] WINDMILL

[76] Inventor: Constant V. David, 4952 Field St., San Diego, Calif. 92110

[21] Appl. No.: 296,973

[22] Filed: Aug. 27, 1981

[51] Int. Cl.$^3$ .............................................. F03D 7/02
[52] U.S. Cl. ................................ 416/132 B; 416/167; 416/41
[58] Field of Search .............. 416/132 R, 132 B, 136, 416/162, 167, 240 A, 41, 229 R, 37

[56] References Cited

U.S. PATENT DOCUMENTS

| | | | |
|---|---|---|---|
| 1,833,059 | 11/1931 | Thomas | 416/167 X |
| 1,857,509 | 5/1932 | Holmstrom | 416/237 |
| 2,000,049 | 5/1935 | Taylor | 416/162 X |
| 2,020,366 | 11/1935 | MacCallum | 416/162 X |
| 2,309,899 | 2/1943 | Hepperle | 416/162 |
| 2,584,663 | 2/1952 | Bensen | 416/132 X |
| 3,874,816 | 4/1975 | Sweeney | 416/139 |
| 4,083,651 | 4/1978 | Cheney et al. | 416/18 |

FOREIGN PATENT DOCUMENTS

| | | | |
|---|---|---|---|
| 311416 | 5/1919 | Fed. Rep. of Germany | 416/81 |
| 752142 | 9/1933 | France | 416/132 R |
| 1149452 | 12/1957 | France | 416/136 |
| 2288877 | 5/1976 | France | 416/132 B |
| 2395187 | 2/1979 | France | 416/132 R |
| 264870 | 7/1928 | United Kingdom | 416/132 |
| 588112 | 5/1947 | United Kingdom | 416/136 |
| 707620 | 4/1954 | United Kingdom | 416/132 B |
| 991744 | 5/1965 | United Kingdom | 416/189 R |
| 1188947 | 4/1970 | United Kingdom | 416/132 |

Primary Examiner—Everette A. Powell, Jr.
Attorney, Agent, or Firm—Brown & Martin

[57] ABSTRACT

A windmill having blades with both variable pitch and variable spanwise twist. The windmill includes a hub which may be supported on top of a tower for rotation about a substantially horizontal axis. A plurality of blades are provided, each having a root, a tip and a spanwise twistable intermediate section. Linkage mechanisms connect the roots of the blades to the hub to permit selective independent rotation of the roots and the tips of the blades for varying the pitch and the spanwise twist of the blades. An electric power generator is drivingly connected to the hub. A control mechanism is connected to the linkage mechanisms for varying the pitch and spanwise twist of the blades in accordance with a predetermined desired relationship. The aerodynamic properties of the blades are adjusted by the control mechanism to permit the most efficient generation of electric power under most wind conditions, while minimizing the extent of the supporting tower structure normally necessary to accommodate heavy wind conditions. This may be done by maximizing the torque and rotational velocity for minimum reactive forces being exerted on the supporting tower.

13 Claims, 35 Drawing Figures

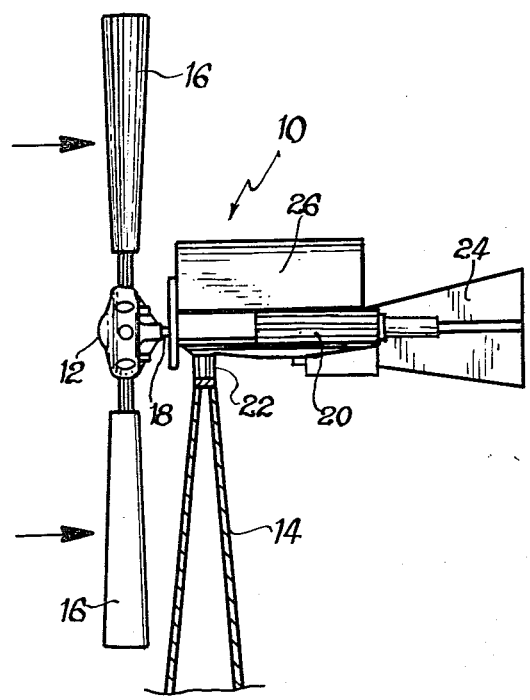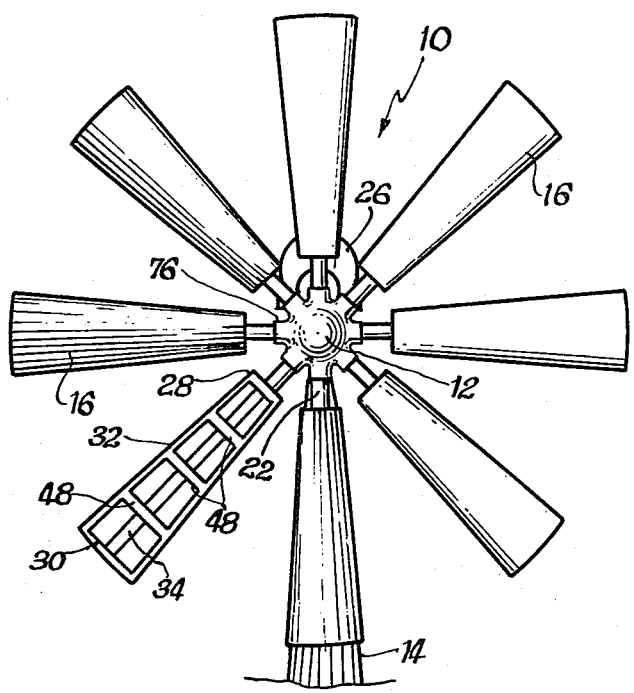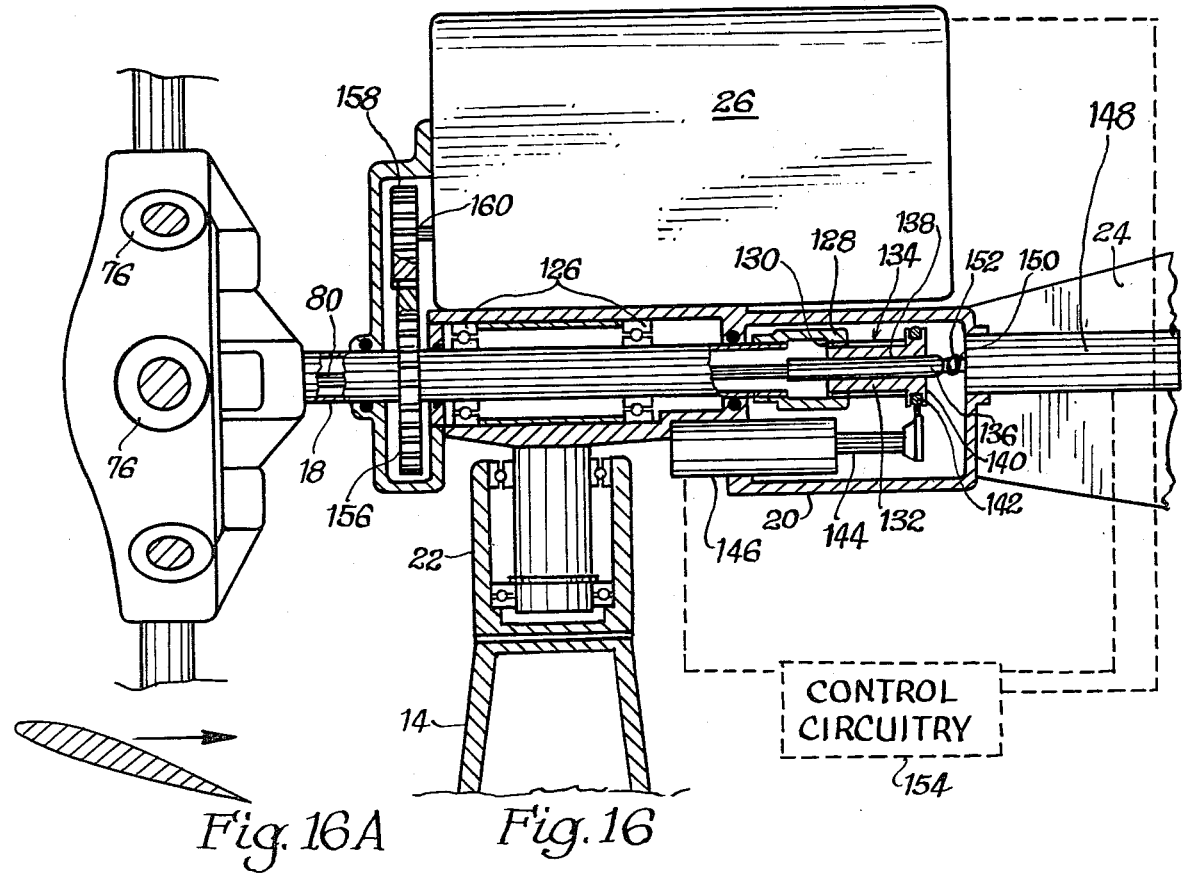
Fig. 1   Fig. 2   Fig. 16A   Fig. 16

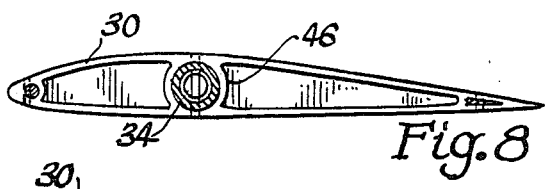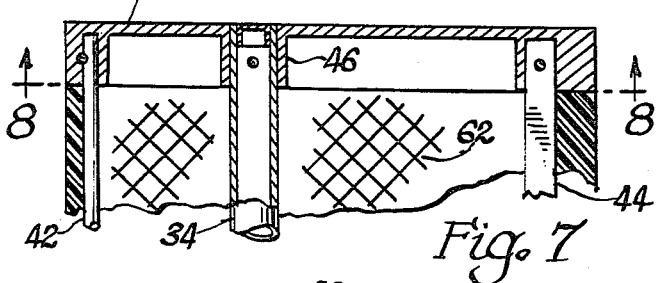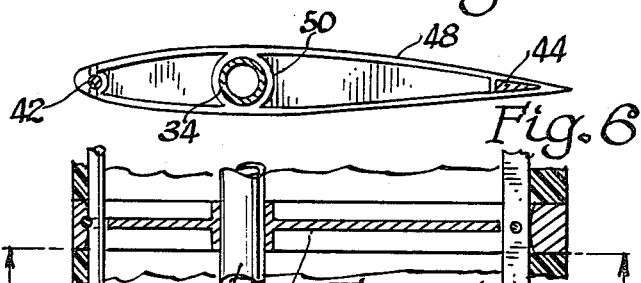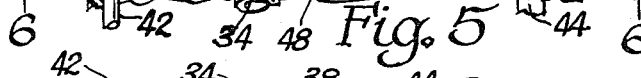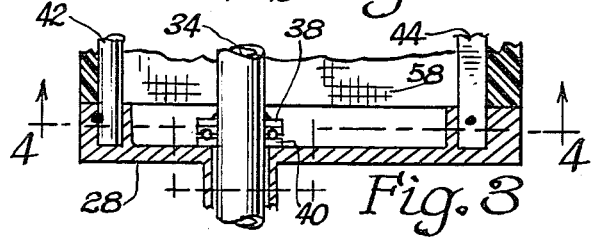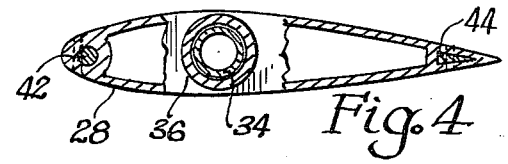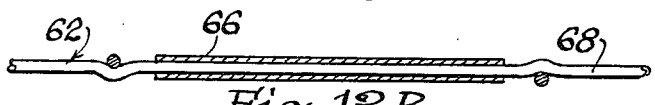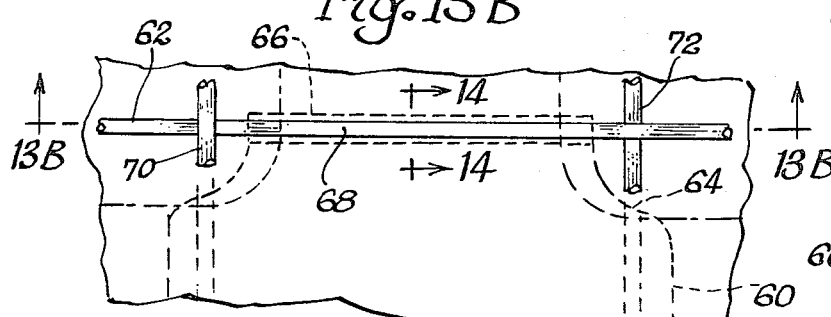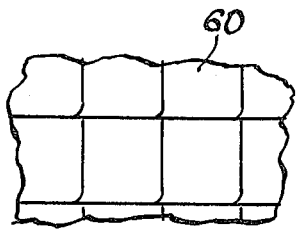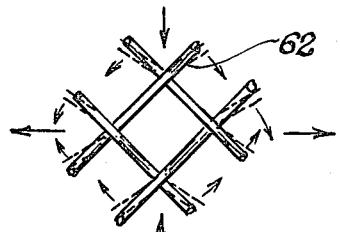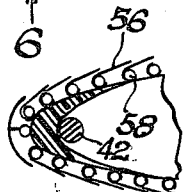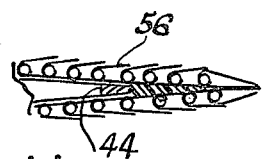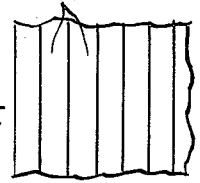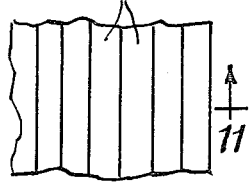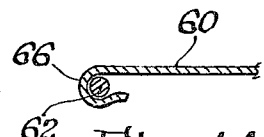

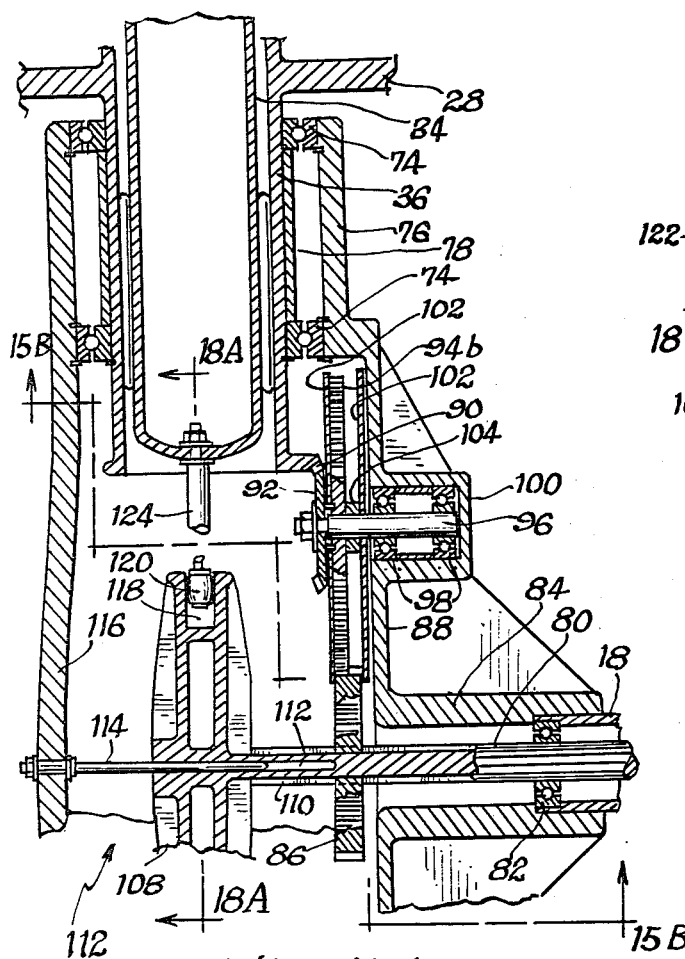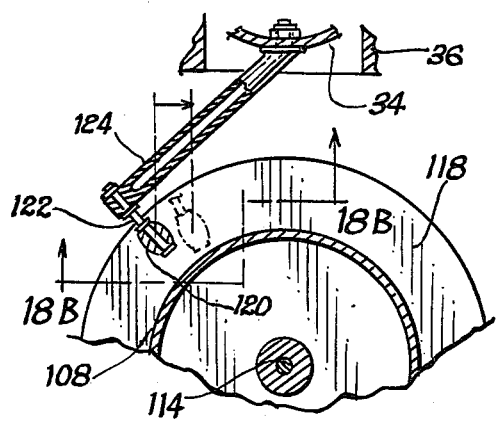
Fig. 18A
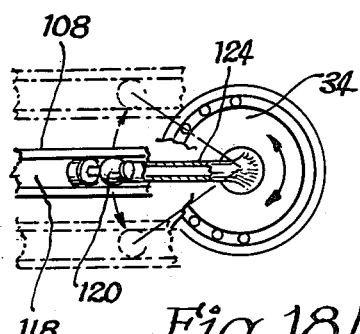
Fig. 18B
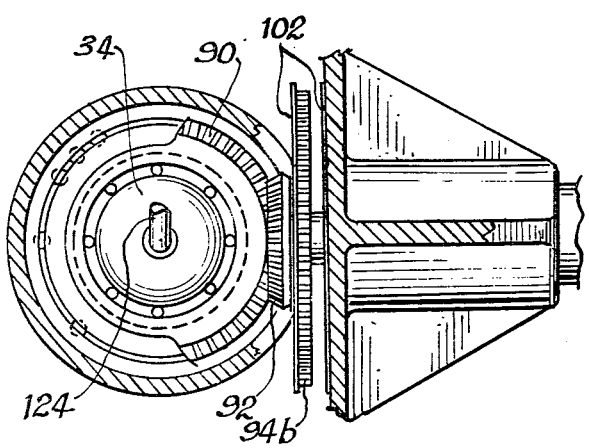
Fig. 15A
Fig. 15B
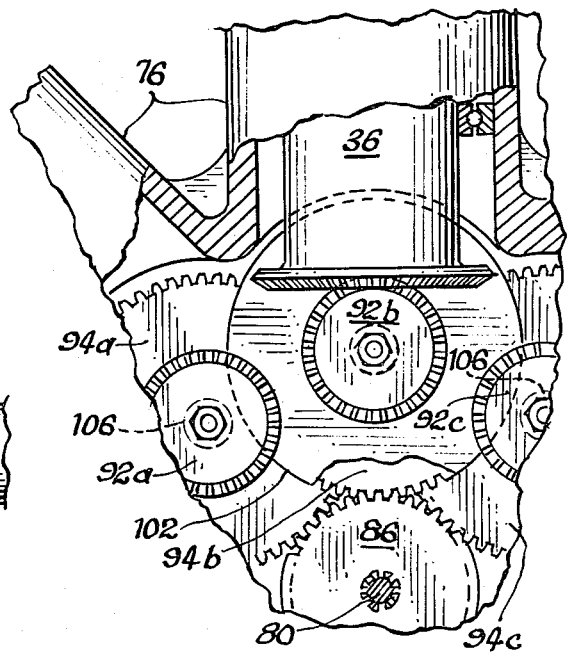
Fig. 17

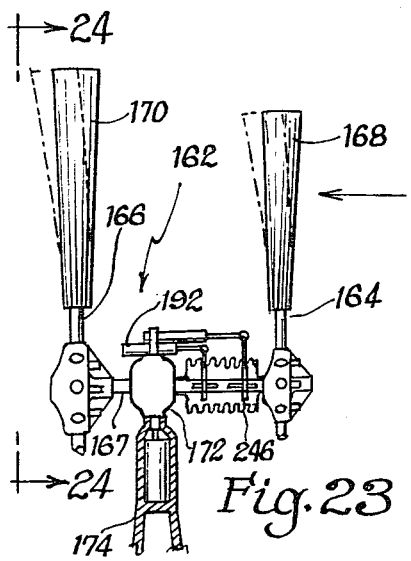
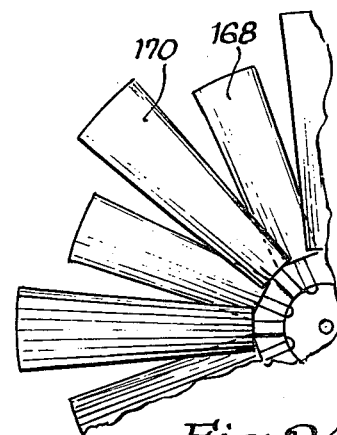
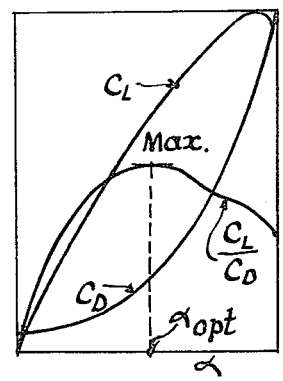
Fig. 23    Fig. 24    Fig. 19
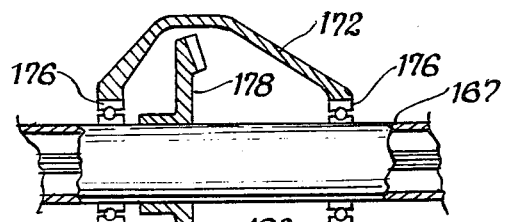
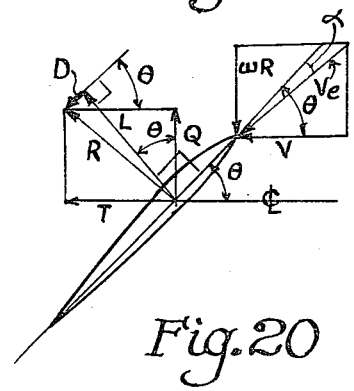
Fig. 25    Fig. 20
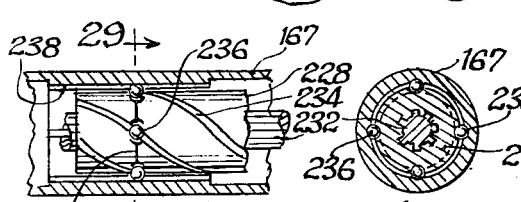
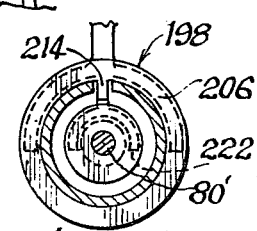
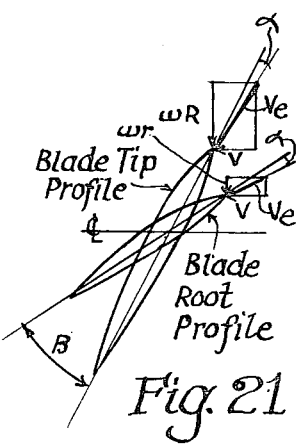
Fig. 28    Fig. 29    Fig. 27B    Fig. 21
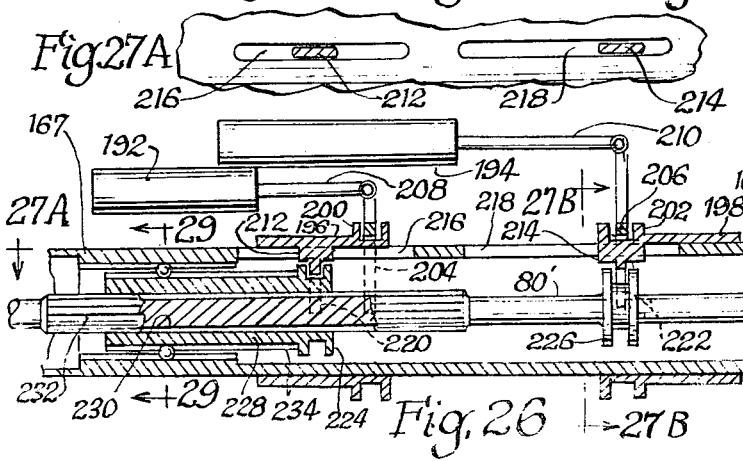
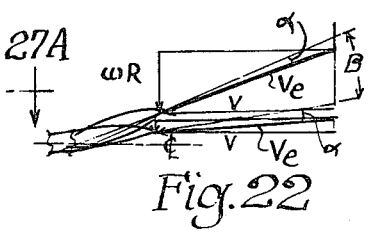
Fig. 27A    Fig. 26    Fig. 22

4,364,708

WINDMILL

BACKGROUND OF THE INVENTION

The present invention relates to electric power generating windmills, and more particularly, to a windmill having blades with both variable pitch and variable spanwise twist.

For centuries windmills have been used to harness the energy of the wind to grind grain, operate water pumps and drive various other machines. More recently, windmills have been utilized to generate electric power.

The ever increasing cost of energy has led to renewed interest in windmills as a source of electric power. The reliability of windmills, coupled with the fact that they are non polluting, makes them particularly attractive as a partial solution to the energy crisis.

Heretofore, various mechanisms have been utilized to control the operation of windmills. Pivotal supports and wind vanes have been utilized to point windmills into the wind. Governors have been utilized to control windmill rpm. Still, other windmills have incorporated mechanisms for automatically varying the pitch of their blades.

When utilizing a windmill to generate electricity, it is desirable to accommodate fluctuations in wind velocity to insure efficient power generation under most wind conditions. This requires mechanisms for optimizing the aerodynamic properties of the windmill blades.

It is also desirable to eliminate the necessity of utilizing extensive supporting towers in connection with windmills while at the same time insuring against damage under high wind conditions. Preferably, this is accomplished without sacrificing the ability to continuously generate electric power in an efficient manner.

SUMMARY OF THE INVENTION

It is therefore a primary object of the present invention to provide an improved windmill for efficiently generating electric power under most wind conditions.

It is another object of the present invention to provide an improved windmill which does not require an extensive supporting tower.

It is still another object of the present invention to provide an improved windmill in which the aerodynamic properties of its blades can be optimized for a given wind condition.

Accordingly, the present invention provides a windmill having blades with both variable pitch and variable spanwise twist. The windmill includes a hub which may be supported on top of a tower for rotation about a substantially horizontal axis. A plurality of blades are provided, each having a root, a tip and a spanwise twistable intermediate section. Linkage mechanisms connect the roots of the blades to the hub to permit selective independent rotation of the roots and the tips of the blades for varying the pitch and the spanwise twist of the blades. An electric power generator is drivingly connected to the hub. A control mechanism is connected to the linkage mechanisms for varying the pitch and spanwise twist of the blades in accordance with a predetermined desired relationship. The aerodynamic properties of the blades are adjusted by the control mechanism to permit the most efficient generation of electric power under most wind conditions, while minimizing the extent of the supporting tower structure normally necessary to accommodate heavy wind conditions. This may be done by maximizing the torque and rotational velocity for minimum reactive forces being exerted on the supporting tower.

BRIEF DESCRIPTION OF THE DRAWINGS

FIG. 1 is a simplified side view of a first embodiment of the windmill.

FIG. 2 is a front elevation view of the windmill of FIG. 1.

FIG. 3 is an enlarged fragmentary view of the root of one of the blades of the windmill of FIGS. 1 and 2 with the covering of the blade removed.

FIG. 4 is a sectional view of the root of the blade taken along line 4—4 of FIG. 3.

FIG. 5 is an enlarged fragmentary view of the intermediate section of one of the blades of the windmill of FIGS. 1 and 2 with the blade covering material removed.

FIG. 6 is a sectional view taken along line 6—6 of FIG. 5.

FIG. 7 is an enlarged fragmentary view of the tip of one of the blades of the windmill of FIGS. 1 and 2 with the outside covering material removed.

FIG. 8 is a sectional view of the blade taken along the line 8—8 of FIG. 7.

FIG. 9 is a fragmentary sectional view illustrating a flexible skin type covering for the windmill blades.

FIG. 10 is a fragmentary planar view illustrating a Venetian blind type covering for the windmill blades.

FIG. 11 is a sectional view taken along line 11—11 of FIG. 10.

FIG. 12 is a fragmentary planar view illustrating a fish scale type covering for the windmill blades.

FIG. 13A is an enlarged, planar view illustrating construction details of the fish scale type blade covering.

FIG. 13B is a fragmentary longitudinal cross-sectional view of the hook arrangement which retains the fish scale type blade covering onto the wire mesh supporting grid.

FIG. 13C is a simplified planar view of a portion of the wire mesh grid illustrating the shearing deformation of the grid that occurs when a blade having the fish scale type covering is twisted.

FIG. 14 is an enlarged, fragmentary sectional view taken along line 14—14 of FIG. 13A illustrating further details of the fish scale type blade covering.

FIG. 15A is an enlarged, fragmentary sectional view illustrating details of the manner in which the blades of the windmill of FIGS. 1 and 2 are connected to the hub.

FIG. 15B is a sectional view taken along line 15B—15B of FIG. 15A.

FIG. 16 is an enlarged, vertical sectional view of the first embodiment of the windmill illustrated in FIGS. 1 and 2.

FIG. 16A is an end view of a typical airfoil cross-section of one of the windmill blades.

FIG. 17 is a fragmentary, enlarged front elevational view showing details of the planetary gear drive within the hub of the first embodiment of the windmill.

FIG. 18A is a sectional view taken along line 18A—18A of FIG. 15A showing further details of the linkage within the hub of the windmill of FIGS. 1 and 2.

FIG. 18B is a sectional view taken along line 18B—18B of FIG. 18A.

FIGS. 19-22 are graphs illustrating some of the aerodynamic characteristics of the blades.

FIG. 23 is a simplified view of a second embodiment of the windmill of the present invention.

FIG. 24 is a fragmentary, back elevation view of the windmill of FIG. 23 taken from the left hand end in FIG. 23.

FIG. 25 is an enlarged, vertical sectional view of the mechanisms of the windmill of FIG. 23 which connect the windmill propellers to the tower.

FIG. 26 is an enlarged, fragmentary, partially vertical sectional view of a portion of the main and control shafts of the second embodiment of the windmill illustrated in FIG. 23 showing the actuator mechanisms and linkages utilized therein to permit variable blade pitch and variable spanwise blade twist.

FIG. 27A is an enlarged, fragmentary, planar view of the outside of the main shaft illustrated in FIG. 26 taken from the top side in FIG. 26 along line 27A—27A of FIG. 26.

FIG. 27B is a vertical sectional view taken along line 27B—27B of FIG. 26.

FIG. 28 is a fragmentary, part sectional and part elevational view of the mechanisms within the main shaft of the second embodiment of the windmill which permits relative rotation between the main shaft and the control shaft.

FIG. 29 is a vertical sectional view taken along lines 29—29 of FIG. 26 or 28.

DESCRIPTION OF THE PREFERRED EMBODIMENTS

Referring to FIGS. 1 and 2, a windmill 10 includes a hub 12 supported for rotation about a substantially horizontal axis on top of a tower 14. A plurality of blades 16 extend radially from the hub. The hub 12 is connected to a main horizontal power shaft 18 which extends through an actuator housing 20. A bearing assembly 22 on top of the tower 14 supports the actuator housing 20 for rotation about a vertical axis. A vane 24 extends from the end of the housing 20 opposite from the hub and blades. The vane serves to point the propeller formed by the combination of the blades and the hub into the wind whose direction is shown by the arrows in FIG. 1. A generator 26 is mounted to the top of the actuator housing 20. The generator is drivingly connected with the power shaft 18 so that electric power is generated upon rotation of the windmill propeller by the wind.

Each blade 16 has an inner root 28, an outer tip 30 and a spanwise twistable intermediate section 32. Linkage means hereafter described are provided for connecting the roots of the blades to the hub to permit selective independent rotation of the roots and tips for varying the pitch and the spanwise twist of the blades. More specifically, as shown in FIG. 2, a spar 34 extends substantially radially from the hub 12 through the center of each blade 16. The linkage means permits the inner root 28 and the outer tip 30 of each blade to be independently rotated about the longitudinal axis defined by the spar. The intermediate section 32 of each blade has a flexible construction hereafter described so that relative rotation of the inner root 28 and/or the tip 30 about the central longitudinal axis of the spar 34 causes a variable and adjustable spanwise twisting of the intermediate section 32. Thus, both the pitch and the spanwise twist of each blade can be controlled.

The internal construction of each blade 16 is shown in FIGS. 3–8. The inner root 28 of the blade comprises an airfoil shaped rib made of a rigid material and through which the cylindrical spar 34 extends. The root 28 has a cylindrical sleeve 36 through which the tubular spar 34 extends. A thrust bearing 38 which surrounds the spar forces a ring bearing assembly 40 which also surronds the spar downwardly in FIG. 3. The side of the ring bearing assembly opposite from the thrust bearing is rigidly secured to the root 28 of the blade so that the root can be rotated about the spar 34. The spar 34 is under compression and the outer covering of the blade is under tension to the extent that at maximum rpm and maximum centrifugal force, the axial motion of the bearing 38 with respect to the ring bearing assembly 40 remains nil at all times.

A leading edge member 42 and a trailing member 44 extend the spanwise length of the blade. The inner ends of these members are rigidly connected to the forward and rearward ends of the root rib 28. The outer ends of these members are connected to the forward and rearward ends of the tip 30 of the blade (FIG. 8). The tip 30 also comprises an airfoil shaped rib made of a rigid material. The leading and trailing edge members 42 and 44 are made of a flexible but substantially inelastic material to permit the root and tip ribs 28 and 30 to be twisted about the central axis of the spar 34. This material preferably has a high tensile modulus of elasticity. The outer end of the spar is rigidly connected to the tip rib 30 and is seated within a sleeve 46 integrally formed with that rib. The thrust bearing 38 (FIG. 3) places the spar 34 under compressive forces while the length of the leading and trailing edge members 42 and 44 is such that they are under tension.

As shown in FIG. 2, a plurality of parallel, spanwise spaced apart intermediate ribs 48 are positioned within each blade between its root and tip. Each intermediate rib 48 has an airfoil shape as shown in FIG. 6 and is made of a rigid material. Each intermediate rib has a central sleeve 50 through which the tubular spar 34 extends. During spanwise twisting of the blade, the intermediate ribs 48 rotate about the central axis of the spar 34 and are free, if required, to move up or down with respect to this axis in FIG. 5.

The internal structure of each of the blades illustrated in FIGS. 3–8 is enclosed within a flexible covering which defines the airfoil shape of the blade and permits the blade to twist spanwise while maintaining the tightness of the airfoil skin. The covering material may be a rubber like sheet material which will give and comply as needed without creating wrinkles, creases or ridges so that skin friction remains minimal and the airfoil profile is kept aerodynamically clean. This rubber like material is supported by a semi-rigid structure as shown for example in FIG. 9. The ribs and leading and trailing edge members of a blade are covered by a grid such as a woven metallic mesh 52 which in turn supports a skin 54 made of a suitable plastic or elastic synthetic material.

Alternatively, the blade may be covered by a plurality of parallel, spanwise extending slats 56 (FIG. 10). These slats may be made of sheet metal. Preferably, as shown in FIG. 11, the trailing edge of each slat overlaps the leading edge of the slat immediately behind it. The forward edges of each slat hook inwardly at spaced locations on the wires of a wire grid 58 secured to the edges of the ribs with the wire grid oriented as shown in FIG. 3. When the blade is twisted spanwise, the overlapping slats can slide over one another to accommodate the twisting movement. This blade covering arrangement may be referred to as a Venetian blind covering.

Another alternative blade covering is illustrated in FIGS. 12–14. It may be referred to as a fish scale type covering. It provides a compliant, non-stretchable substantially air-tight skin which covers the internal blade structure. It allows shearing motion to accommodate blade twist requiring any surface of expansion or contraction. The internal structure of the blade is covered with a plurality of generally rectangular flat or slightly bent metal sheets 60. These sheets overlap one another somewhat like fish scales as best seen in FIG. 12. The ribs of the blade are covered with a woven wire mesh 62 (FIG. 13A) which is diagonally oriented as shown in FIG. 7. The leading edge of each metal sheet 60 is hooked downwardly about a segment of wire of the wire mesh 62 (FIGS. 13B and 14). Each of the metal sheets 60 is tapered inwardly at 64 as shown in FIG. 13A so that the leading edge 66 can hook around a segment of wire 68 extending between two orthogonally extending wires 70 and 72. Thus, when the blade is twisted spanwise, each of the fish scale metal sheet 60 is free to articulate about the wire segment to which it is attached. Each metal panel is also free to slide over and under adjacent panels to accommodate the twisting of the blade. The wires of the mesh 62 undergo shearing deformation as illustrated in FIG. 13C.

The linkage means for independently rotating the root and tip of each blade will now be described. As shown in FIG. 15A, the inner cylindrical sleeve 36 which extends from the root 28 of each blade is journaled in a spaced pair of ball bearings 74 mounted within corresponding cylindrical projections 76 (FIGS. 2, 15A and 16) formed about the circumference of the hub 12. These projections are circumferentially spaced an equal distance apart from one another and are oriented so that the blades 16 extend radially from the rotational axis of the windmill propeller. A sleeve 78 (FIG. 15A) maintains the spacing between the ball bearings 74.

The main horizontal power shaft 18 (FIG. 16) concentrically houses a smaller control shaft 80 (FIG. 15A) journaled for relative rotation and longitudinal motion with respect to the shaft 18 by ball bearings such as 82 within which the control shaft 80 can slide longitudinally. The forward end of the main power shaft 18 is rigidly fixed to a central neck portion 84 of the hub. The forward end of the control shaft 80 extends through the neck portion 84 and has a central spur gear 86 mounted thereon just forward of a back plate 88 of the hub.

The central spur gear 86 forms the center of a planetary gear drive which overlies the back plate 88 of the hub and which permits rotation of the control shaft 80 to produce simultaneous rotation of each of the sleeves 36 of the eight separate blades 16 in an equal degree. Each of the sleeves 36 is integrally formed with the inner root 28 of a corresponding blade. Thus, rotation of the control shaft 80 is utilized for rotating the roots of each of the blades simultaneously in the same amount. In order to permit this control, the inner end of each of the sleeves 36 is provided with a beveled gear segment 90 (FIGS. 15A and 15B) which intermeshes with a corresponding beveled gear 92. Each of the gears 92 is bolted concentrically over the face of a corresponding spur gear 94 carried by a stub shaft 96. The stub shaft is journaled in ball bearings 98 mounted within corresponding cylindrical receptacles 100 integrally formed in the back plate 88 of the hub.

As illustrated in FIG. 17, the eight spur gears 94 are staggered so that they can each engage the central spur gear 86 while fitting within the hub 12 and enabling each of the beveled gears 92 to engage the beveled gear segment 90 of the corresponding blade sleeve 36. The thickness of each of the spur gears 94 is approximately half of the spur gear 86 as illustrated in FIG. 15A. Each of the spur gears 94 overlaps adjacent spur gears 94 and is positioned either in front or behind the adjacent pair. The four forwardmost spur gears 94 such as the ones shown in FIG. 15A are positioned between a pair of guide disks 102 which overlap the peripheries of the opposite side of the central spur gear 86 to maintain the necessary alignment. The central spur gear 86 is splined to the forward portion of the control shaft 80 so that the shaft can move axially with respect to the spur gear. The guide disks 102 prevent axial movement of the central spur gear when the splined power shaft 80 is moved forwardly and rearwardly. A spacer 104 (FIG. 15A) is positioned between the spur gear and the rearward one of the guide disks 102 to provide the necessary distance between the guide disks to enable them to surround the periphery of the central spur gear 86.

Referring to FIG. 17, the spur gears 94a and 94c each fit within the space between the spur gear 94b and the rearward guide disk 102 shown in FIG. 15A. The spur gears 94a and 94c (FIG. 17) are not sandwiched between the spacer disks but instead are held in alignment by appropriately sized spacers such as 106. The spacers 106 maintain the appropriate spacing between, for example, the spur gear 94a and its associated beveled gear 92a. The remainder of the planetary gear drive is similarly constructed and need not be further described.

The linkage means of the windmill is further adapted for permitting each of the central spars 34 (FIG. 15A) of the blades to be rotated by axial movement of the control shaft 80. An annular drive member 108 (FIG. 15A) is rigidly connected to the forward end of the control shaft 80. It includes a stub shaft portion 110 which is integrally formed with the forward end of the control shaft 80. The stub shaft portion 110 and the main body portion of the drive member have an axially extending bore 112 which extends therethrough. A guide rod 114 has its forward end bolted through the center of the front plate 116 of the hub. The rearward end of the guide rod extends within the bore 112 of the drive member 108 to help support the cantilevered weight of the drive member. The shaft 80 and the drive member 108 carried thereby can thus be moved axially (left and right in FIG. 15A).

An annular groove 118 is formed in the periphery of the annular drive member 108. Seated in the groove 118 is a ball 120 (FIGS. 15A, 18A and 18B). A drive pin 122 (FIG. 18A) has one end rotatably connected to the ball 120 and an opposite rotatably connected to one end of the linkage arm 124. The other end of the linkage arm is bolted to the closed inner end of the central spar 34 which extends through the sleeve 36 of the corresponding blade. As the shaft 80 moves axially, its splined forward portion slides within the central spur gear 86 which remains fixed in position since its peripheral edges are positioned between four pairs of opposing guide disks 102 (FIG. 15A). When the control shaft 80 is moved axially, the drive member 108 moves axially as indicated in FIG. 15A and also shown in phantom lines in FIG. 18B. This motion is transmitted through the linkage arm 124 to rotate the central spar 34. Since the outer end of the central spar 34 is rigidly connected to the tip 30 (FIG. 7) of the blade, the tip is thus rotated, and such rotation is independent of the rotation of the root 28 of the blade, which is governed only by a relative rotation of control shaft 80 with respect to the power shaft 18. The other central spars 34 of the other blades are similarly connected to the driving member 108 so that axial movement of the shaft 80 will simultaneously rotate the tips of all of the blades to the same degree. As the drive member 108 is moved axially, the balls 120 pivot and rotate within the annular groove 118.

The control means for varying the pitch and the spanwise twist of the blades can now be described by way of reference to FIG. 16. The main power shaft 18 whose forward end is rigidly connected to the hub 12 is journaled in ball bearings 126 mounted within the actuator housing 20. One end of a cylindrical sleeve 128 is rigidly secured over the rearward end of the shaft 18. The rearward end of this sleeve has helical threads formed on its inner surface 130. A nut 132 is helically splined on its outer surface 134 so that it can threadably engage the inside surface 130 of the sleeve 128. The rearward end of the control shaft 80 has an axially splined rod 136 secured thereto. This axially splined rod extends through a splined bore 138 which extends axially through the nut 132. The rearward end of the nut 132 has a grooved flange 140 integrally formed therewith.

Rotatably journaled in the groove of the flange 140 (FIG. 16) is a yoke 142 which is connected to the rod 144 of a first linear actuator 146. This linear actuator includes an electric motor and a gear drive assembly for extending and retracting the rod 144 is preselected increments. Such extension or retraction causes the nut 132 to slide within the helical threads of the sleeve 128, thus causing relative rotation between the power shaft 18 and the control shaft 80. It will be understood that the axially splined rod 136 and the nut 132 having inside axially splines rotate together, however the rod 136 is free to move axially with respect to the nut 132. During actual operation of the windmill, the sleeve 128 and the nut 132, along with the power shaft 18 and the control shaft 80 rotate at the same period. The flange 140 of the nut 132 rotates with the stationary yoke 142 which is always connected to the first linear actuator 146. However, energization of the first linear actuator assembly 146 causes a slight relative rotation between the shafts 18 and 80, which in turn causes the roots of the blades to rotate simultaneously, the relative rotation of the control shaft 80 being transmitted to the roots of the blades through the planetary gear drive previously described.

A second linear actuator 148 (FIG. 16) is mounted to the rear of the actuator housing 20 and includes a rod 150 which may be selectively extended and retracted. The end of the rod 150 of the second linear actuator assembly is connected to the rearward end of the rod 136 through a rotatable coupling 152. Thus, the shaft 80 can be moved axially forwardly or rearwardly by the second linear actuator assembly 148 by selectively extending or retracting the non-rotating rod 150. The second linear actuator assembly 148 may have a construction similar to the first linear actuator assembly 146. Forward or rearward axial movement of the inner control shaft 80 causes simultaneous rotation of the tips of the blades, the motion being transferred by the annular drive member 108 and the plurality of linkage arms 124 (see FIGS. 15A, 18A and 18B).

The first and second linear actuator assemblies 146 and 148 (FIG. 16) can be operated simultaneously to rotate both the roots and tips of all of the blades for adjusting the pitch and spanwise twist of the blades to achieve optimum aerodynamic shape for a given wind condition. The linear actuator assemblies 146 and 148 may be connected to automatic control circuitry shown schematically at 154 in FIG. 16 which monitors the power output of the generator 26 and operates the linear actuators according to an internal program to accomplish automatic adjustment of the pitch and spanwise twist of the blades in order to optimize power generation under a wide range of wind conditions. For example, it may be desirable to drive the generator at a substantially constant rpm in order to obtain a 60 Hz AC power output. The driving connection between the generator 26 and the windmill propeller is provided by a spur gear 156 rigidly mounted to the power shaft 18. The gear 156 intermeshes with another spur gear 158 connected to the outer end of the generator shaft 160.

In low wind conditions, the control circuitry 154 (FIG. 16) adjusts the pitch and spanwise twist of the blades to achieve the necessary combination of torque and rpm. In high wind conditions, the control circuitry adjusts the pitch and spanwise twist to maintain acceptable forces on the windmill tower. Above a specified wind velocity, the blades may be feathered as required so that a maximum rpm limit will not be exceeded. The control circuitry 154 may include a digital microprocessor which utilizes a blade configuration program stored in a read only memory (ROM). The microprocessor determines the appropriate pitch and spanwise twist and then sends command signals to drive circuitry for operating the linear actuators 146 and 148.

A typical airfoil cross-section is shown in FIG 16A seen from the blade tip and looking at the windmill propeller rotational axis. The airfoil may have the aerodynamic characteristics shown in FIG. 19, where $C_L$ is the lift coefficient and $C_D$ is the drag coefficient, both being plotted as a function of the angle of attack $\alpha$. The ratio of $C_L/C_D$ is also shown to indicate that, for an airfoil to function most efficiently in general, the angle of attack $\alpha$ should remain smaller than $\alpha_{opt}$ which corresponds to the maximum of the $C_L/C_D$ curve. Generally $\alpha_{opt}$ is less than 10 degrees and small compared to the pitch angle theta ($\theta$) of the blade. Even when the lift is zero, there is always a residual drag that corresponds to the skin/air friction and/or slight turbulences (vortices left behind the profile) always present in the case of non-perfect gases, at any rpm and/or wind velocities.

Assuming that the wind direction is along the windmill propeller axis, the force and velocity vectors shown in FIG. 20 indicate how the windmill blades produce the two actions of interest;

(1) a force Q acting on the blades in the plane perpendicular to the windmill propeller rotational axis that generates the torque and ensuing power; and (2) another force T that creates a thrust that pushes the windmill in the direction of the wind and which must be reacted to by the windmill supporting tower.

The higher the thrust, the heavier and costly the tower must be, for any maximum value of wind velocity that is acceptable in the power producing mode of operation. Above such a maximum critical wind velocity, the blades should be feathered to prevent damage to the windmill (excessive thrust or runaway rpm). For a maximum thrust that the windmill can withstand, the power generated by the windmill should be maximized.

The parameters of importance are:

(1) the wind velocity V;
(2) the rotational speed $\omega$ of the windmill propeller;
(3) the distance R between the airfoil station and the windmill propeller rotational axis
(4) the resulting apparent velocity $\omega R$ of the airfoil with respect to the windmill propeller rotational axis;
(5) the relative velocity $V_e$ of the airfoil with respect to the wind (vectorial resultant of V and $\omega R$);
(6) the angle of attack $\alpha$ of this velocity $V_e$ with the airfoil chord (defined as the line that joins the two extreme points, lengthwise, of the airfoil), with the assumption that when $V_e$ and the chord are in line ($\alpha = 0$), no lift is created;
(7) the pitch angle $\theta$ of the airfoil (angle between V and the airfoil chord);
(8) the lift L that the wind exerts on the airfoil (perpendicular to the airfoil chord);
(9) the drag D that the wind exerts on the airfoil (parallel to the airfoil chord);
(10) the resulting force R that is applied to the center of pressure of the airfoil;
(11) the force T, or thrust that is applied to the blade in the direction of the center line, which acts on the windmill hub and subsequently on the supporting tower; and
(12) the other force component Q which pushes the blade in a direction perpendicular to the windmill propeller rotational axis and which produces the torque and, then, the energy.

The component Q is the only useful force and which must be maximized at all times, except when the wind velocity exceeds a safe acceptable critical limit beyond which the operation of the windmill is no longer desired because it would be dangerous.

The angle between L and Q being equal to $\theta$, the relationships between all these parameters can be expressed as follows for any value of $\alpha$:

$T = (L) \sin \theta + (D) \cos \theta$ and $Q = (L) \cos \theta - (D) \sin \theta$
with: $\theta = \alpha + \arctan (\omega R/V)$ For any value of $\theta$ (0 to $\pi/2$) (where L is directly proportional to $C_L$ and D to $C_D$, all other parameters being equal), the component D increases the thrust T and decreases the torque component Q. This means that it has a "double negative" effect on the overall efficiency of the blades and, as a result, on the cost effectiveness of the windmill operation (ratio of the amount of energy produced by unit time to the cost of the installation, which increases with the weight of the tower and anchoring system). Therefore, airfoil profiles that are aerodynamically efficient (high $C_L/C_D$) are preferred. Unfortunately, such profiles have a smaller range of desirable $\alpha$'s (between 0 and $\alpha_{opt}$). For such profiles, $\alpha_{opt}$ is generally less than 10 degrees and small compared to $\theta$, which means that $\theta$ is approximately equal to arctan ($\omega R/V$).

Moving from the blade tip toward the windmill hub (or blade root), because both V and $\omega$ are fixed for any optimum operation point of the windmill, $\omega R$ decreases proportionately to R. This means that if $\alpha$ is to remain constant along the blade, $\theta$ must decrease and the airfoil profile must rotate around the blade axis so that, at any blade station, the airfoil efficiency is kept maximum. This change of angle $\theta$ corresponds to the twisting or warping of the blade, between tip and root. Now, as either the windmill rotational speed and/or the wind velocity vary, the angle $\theta$ must also vary and be adjusted to keep all blade stations operating at peak efficiency (same $\alpha$, but adjusted to provide either maximum power or the level of power required). This is especially desirable at both extremes of the wind velocity spectrum.

FIG. 21 shows two airfoil profiles (blade tip and root) at low wind velocity and given $\omega$. FIG. 22 shows the same two profiles (for the same $\omega$) at four times that wind velocity. As these graphs illustrate, not only must the blade rotate in its entirety to adjust the pitch (to keep the same $\alpha$) but also warp (variation of the angle between the tip chord and the root chord). The warp variation (difference between the angle B of FIG. 21 and angle B of FIG. 22) is much larger than the value of (twice or three times as much for most airfoil profiles of interest). This demonstrates why the pitch angle of the blades must be adjustable, but just as important, that the degree of warping of the blades, from root to tip, must also be made adjustable.

As explained above, two parameters (blade pitch and blade warp or spanwise twist) must be adjusted independently to provide for optimum operation of the windmill under varied conditions, the most wind velocities (for at least 80% to 90% of the time) and either at fixed rpm (for 60 Hz current generation) or at variable rpm and maximum power output. Whichever mode of operation is desired (depending upon the type of electrical generator), the control principles are similar as far as the invention is concerned.

In the case of a 60 Hz AC generator, a fixed value of must $\omega$ be maintained regardless of the power level, unless a variable speed drive is provided between the windmill power shaft and the generator shaft. If $\omega$ is to be kept constant, a frequency detector (not shown) senses the AC cycles per second (cps). That signal is processed by the control circuitry 154 (FIG. 16) and, according to programmed instructions, another signal is sent to the blade pitch actuator to reduce the pitch of the blade if the cycles per second (cps) value is too high (the generator is producing more power than required) and thereby to reduce the torque and adjust the power level. At high power levels (high wind velocities), an overriding control system comes into play. To that effect, a thrust sensor (not shown) detects the action of the windmill on the supporting tower. If the signal is above a certain predetermined level, a signal is sent to the control circuitry 154 to adjust the degree of warping of the blade to maintain the power level required and keep the thrust below the present limit. Based on cps, power level and pitch angle, the degree of warping of the blade, the control circuitry 154 determines the direction and the amount of adjustment required, and sends the required command signal to the blade warp control actuator. Feedback control is accomplished through the sensing of cps, power level and thrust amount.

In the case of a DC generator, the critical parameters are $\omega$ (runaway condition that would lead to unacceptable high centrifugal forces being exerted on the blade, and higher than a set limit) and windmill thrust (forces acting on the supporting tower higher than the level that corresponds to the maximum stress level that is acceptable for the structure component). To insure that neither limit is exceeded, both $\omega$ and the thrust are continuously detected and monitored. First, the blade pitch is adjusted to keep ω below the predetermined limit, then the blade degree of warping is adjusted to limit the amount of thrust. For any power level required, even at lower wind velocities (low load), the parameter ω must be constantly monitored through blade pitch control. If less than maximum power is required (and the windmill could produce more power at this time), the efficiency of the windmill is immaterial. But when maximum power is needed, it becomes important to limit the windmill thrust at a safe acceptable level. Only then does the blade aerodynamic efficiency at all blade stations become of significance.

In both cases, AD and DC generation, the primary parameter is the windmill rotational speed, although for different reasons. Because wind power is free, the refinement of warping of the blades and subsequent higher windmill efficiencies is most importantly needed at highload operating conditions of the windmill to mimimize the installation cost for a given power production level. However, at low wind velocities, it is also very important to extract the greatest amount of energy from the wind with the installation. This can be achieved in both cases by making the blades operate at the maximum value of $C_L$ in order to maximize the torque, ignoring the thrust since it is very small. In most land locations, being able to lower the windmill start up velocity from 10 mph down to 7 mph would considerably increase the power generation time, and in the range of 7 mph to 20 mph would also considerably increase the power level of the windmill.

A second embodiment 162 of my windmill is illustrated in FIG. 23. It includes forward and rearward propellers 164 and 166 mounted on opposite ends of a power shaft 167. These propellers each have blades and a hub connected by a linkage in a similar fashion to that described in connection with the first embodiment so that their roots and tips may be independently rotated to adjust the pitch and spanwise twist of the blades. As shown in FIG. 24, the blades 168 of the forward propeller 164 are positioned between the blades 170 of the rearward propeller 166 in order to maximize the power derived from the wind. The blades 170 of the rearward propeller are substantially longer than the blades 168 of the forward propeller. The power shaft 167 which carries both of the propellers is rotatably journaled in a power-take-out gear box 172. This gear box is supported on top of a tower 174 for rotation about a substantially vertical axis. By having the rearward propeller 166 substantially larger than the forward propeller 168, there is no need to include a wind vane. The power shaft 167 will naturally orient itself as shown in FIG. 23 so that it is in line with the wind whose direction is shown by the arrow. The propeller 164 will be positioned in front of the propeller 166.

As shown in FIG. 25, the power shaft 167 is journaled in a pair of ball bearings 176 mounted in opposite ends of the power take out gear box 172. A beveled gear 178 intermeshes with another beveled gear 180 connected to the outer end of the shaft 182 of a generator 184 vertically positioned on top of a tower 174. The shaft 182 of the generator is journaled in a pair of ball bearings 186 mounted within the cylindrical sleeve 188 which extends from the bottom of the power take-out box 172. The cylindrical sleeve 188 is in turn journaled in bearings 190 mounted in the cylindrical throat of a generator housing 191.

As in the case of the first embodiment already described, the second embodiment of my windmill includes control means connected to the linkage means within the pair of propeller hubs for varying the pitch and spanwise twist of the blades. First and second linear actuators 192 and 194 (FIGS. 23 and 26) are mounted above the power take-out bear box 172 and may be selectively energized for independently rotating the roots and tips and the blades, respectively. A pair of annular collars 196 and 198 surround the main power shaft 167 on the forward side of the power take-out gear box 172. These collars 196 and 198 include integrally formed spaced pairs of annular flanges 200 and 202 which retain rotatably fixed yoke assemblies 204 and 206 respectively. The legs of these yoke assemblies are rigidly connected to the rods 208 and 210 of the linear actuators 192 and 194. The collars 196 and 198 have inwardly projecting tabs 212 and 214 (FIG. 27A) which extend through respective axially extending slots 216 and 218 formed in the power shaft 167.

Referring again to FIG. 26, rigidly connected to each of the tabs are guide elements 220 and 222 which ride within the central grooves of flanges 224 and 226, respectively. The control shaft 80' which corresponds to the control shaft 80 of the first embodiment, extends through the center of the power shaft 167. The flange 226 is integrally formed with the control shaft 80'. The second linear actuator 194 may be energized to selectively extend its rod 210. This will move the collar 198, the guide element 222 and thus the shaft 80' axially. See FIG. 27B. As in the first embodiment, such axial movement of the inner control shaft 80' causes rotation of the tips of the blades. The axial motion of the control shaft 80' is transferred through annular drive members and linkage arms within the hubs of each of the forward and rearward propellers similar to the corresponding components 108 and 124 (FIG. 15A) of the first embodiment.

The other flange 224 (FIG. 26) is formed on one end of a cylindrical nut 228. The nut has an axially splined bore 230 through which extends a correspondingly splined segment 232 of the control shaft 80'. The outside surface of the nut 228 has a plurality of helical grooves 234 (FIG. 28). A plurality of circumferentially spaced guide balls 236 are each seated in one of the helical grooves 234 and are seated in corresponding splines 238 (FIG. 29) formed in the inside cylindrical surface of the power shaft 167. The guide balls 236 are loosely held together by a ball retaining cage 239.

The first linear actuator 192 (FIG. 26) can be energized to selectively extend and retract the rod 208 for axially moving the collar 196 and the guide element 220. This will cause axial movement of the nut 228 and relative rotation of the power shaft 167 with respect to the control shaft 80' as a result of the helical grooves 234 and guide balls 236 (FIG. 28) which drivingly connect the same. This relative rotation of the shafts 80' and 167 is transmitted through the planetary gear drives within the hubs of the forward and rearward propellers 164 and 166 to cause rotation of the roots of each of the blades. Thus, the actuators 192 and 194 may be controlled by the circuitry 154 which automatically adjusts the pitch and spanwise twist of each of the blades of both the forward and rearward propellers, simultaneously, to enable optimum power generation as previously discussed.

A slip ring assembly 240 (FIG. 25) surrounding the throat 191 of the tower 174 may be utilized for connecting leads 242 from the control circuitry to leads 244 which are connected to the linear actuators 192 and 194.

A flexible bellows 246 (FIG. 23) may surround and seal the various linkages which connect the linear actuators 192 and 194 to the shafts 167 and 80'. The bellows permits axial movement of the yokes 204 and 206. The end flanges of the bellows do not rotate but are provided with slip joints (not shown) within which the power shaft 167 rotates.

Having described various embodiments of a windmill having both variable pitch and variable spanwise twist blades, it should be apparent to those skilled in the art that my invention permits of further modification in both arrangement and detail. Therefore, the protection afforded my invention should be limited only in accordance with the scope of the following claims:

I claim:
1. A windmill comprising:
   a hub;
   means for supporting the hub for rotation about a substantially horizontal axis;
   a plurality of blades each having a root, a tip and a spanwise twistable intermediate section;
   linkages means for connecting the roots of the blades to the hub to permit selective independent rotation of the roots and the tips for varying the pitch and the spanwise twist of the blades independently;
   an electric power generator;
   means for providing a driving connection between the hub and the generator; and
   control means connected to the linkage means for varying the pitch and the spanwise twist of the blades in accordance with a predetermined desired relationship that will optimize generation of electric power.
2. A windmill according to claim 1 wherein the linkage means includes a planetary gear drive.
3. A windmill according to claim 1 wherein the means for supporting the hub includes an outer power shaft and an inner control shaft concentrically mounted within the outer power shaft.
4. A windmill according to claim 3 wherein the control means includes:
   a first linear actuator;
   a second linear actuator;
   means for coupling the first linear actuator with the control shaft so that the first linear actuator can be energized to rotate the control shaft with respect to the power shaft; and
   means for coupling the second linear actuator to the control shaft so that the second linear actuator can be energized to move the control shaft axially with respect to the power shaft.
5. A windmill according to claim 1 wherein each of the blades comprises:
   an inner supporting structure including a spar and a plurality of spaced apart ribs connected to the spar;
   a wire grid covering the inner supporting structure; and
   a plurality of planar scales pivotally connected to the wire grid and overlapping one another to permit spanwise twisting of the blade.
6. A windmill according to claim 1 and further comprising:
   a second hub;
   means for supporting the second hub for rotation about a substantially horizontal axis;
   a plurality of second blades each having a root, a tip and a spanwise twistable intermediate section;
   second linkage means for connecting the roots of the second blades to the second hub to permit selected independent rotation of the roots and the tips of the second blades for varying the pitch and the spanwise twist of the second blades;
   means for providing a driving connection between the second hub and the generator; and
   means for coupling the second linkage means and the control means so that the control means can simultaneously vary the pitch and spanwise twist of the blades on both of the hubs in accordance with the predetermined desired relationship to optimize generation of electric power.
7. A windmill according to claim 1 wherein each of the blades comprises:
   an internal supporting structure including a central spar, a plurality of ribs mounted at spaced apart locations along the spar, a flexible leading edge member connected to the forward ends of each of the ribs, and a flexible trailing edge member connected to the rearward ends of each of the ribs; and
   a layer of flexible material covering the internal supporting structure and defining the airfoil shape of the blade.
8. A windmill according to claim 7 wherein the spar of each blade is under compression and the layer of compliant material of each blade is under tension when the hub is not rotating.
9. A windmill according to claim 1 wherein the control means includes a computer and a memory having stored therein a program of instructions for varying the pitch and spanwise twist of the blades in accordance with the predetermined desired relationship.
10. A windmill according to claim 1 wherein the electric power generator is an AC generator, and the control means includes:
    means for detecting the frequency of the signal output of the generator; and
    means for detecting the force exerted on the hub supporting means during rotation of the hub and the blades carried thereby.
11. A windmill according to claim 1 wherein the electric power generator is a DC generator, and the control means includes:
    means for detecting the force exerted on the hub supporting means during rotation of the hub and blades carried thereby; and
    means for detecting the rpm of the hub and for adjusting the pitch and spanwise twist of the blades to prevent the hub from exceeding a predetermined maximum rpm.
12. A windmill according to claim 1 wherein each of the blades comprises:
    an internal supporting structure; and
    a compliant, non-stretchable substantially air-tight skin.
13. A windmill according to claim 1 wherein:
    the means for supporting the hub includes a hollow power shaft; and
    the linkage means is contained within the hub and the power shaft.

* * * * *